United States Patent [19]

Thames et al.

[11] Patent Number: 5,473,024

[45] Date of Patent: Dec. 5, 1995

[54] SYNTHESIS AND COATING APPLICATION OF CHLORINATED HYDROXYRUBBER

[75] Inventors: Shelby F. Thames, Hattiesburg, Miss.; Zhiqiang A. He, Norwalk, Conn.

[73] Assignee: University of Southern Mississippi, Hattiesburg, Miss.

[21] Appl. No.: 132,137

[22] Filed: Oct. 5, 1993

[51] Int. Cl.⁶ .......................................... C08F 8/18
[52] U.S. Cl. ...................... 525/332.3; 525/355; 525/356; 525/359.1; 525/359.5
[58] Field of Search ................................. 525/332.3, 355, 525/356, 359.1, 359.5

[56] References Cited

PUBLICATIONS

Kim et al "Hydroxylation of Polyisoprene via Addition of Habacetic acids to the Double Bond".
Anbazhagan et al "Study of Mechanical Properties of Urethane–Chlorinated Graft Copolymer System I" Journal of Applied Polymer Science.

Thames et al "The Synthesis and Characterization of Chlorinated Rubber From Low Molecular Weight Guayule Rubber". Agricultural and Synthetic Polymer.

*Primary Examiner*—Edward Cain
*Attorney, Agent, or Firm*—Arnold, White & Durkee

[57] ABSTRACT

The invention relates to chlorinated hydroxyrubber, a method for making chlorinated hydroxyrubber via chlorinating partially hydroxylated rubber with chlorine gas, and environmentally friendly low volatile organic content coatings comprising chlorinated hydroxyrubber.

23 Claims, No Drawings

SYNTHESIS AND COATING APPLICATION OF CHLORINATED HYDROXYRUBBER

This invention was made with government support under Contract No. 89-38200-4372 awarded by the United States Department of Agriculture. The government has certain rights in the invention.

BACKGROUND OF THE INVENTION

1. Field of the Invention

The present invention relates generally to chlorinated hydroxyrubber, a method for making chlorinated hydroxyrubber, and environmentally friendly low volatile organic content coatings comprising chlorinated hydroxyrubber.

2. Background

Chlorination of cis-polyisoprene is a well established industrial process to produce chlorinated rubber. See, e.g., British Patent No. 381,038 (1859) and U.S. Pat. No. 1,234,381 (1912). Chlorinated rubber has long been used in surface coatings to provide abrasion resistance, chemical and water resistance, flame retardance, durability and toughness. It is one of the best anticorrosive binders widely used in hostile environments such as marine coatings, swimming pool coatings and traffic paints.

Chlorinated rubber, however, is a non-convertible or nonreactive binder. That is, chlorinated rubber does not react with other ingredients in the coating composition. Thus its applications have been limited to solvent based coatings of high volatile organic content (VOC). Such coatings are cured exclusively by solvent evaporation, which causes air pollution. Although still allowed, high VOC coatings have been largely replaced by new technologies such as water borne, high solids, and powder coatings in response to stringent legislative regulatory requirements.

Chlorinated rubber coatings suffer from a further problem of poor solvent resistance due to lack of crosslinking between the chlorinated rubber binder and the solvents or diluents used in the coating compositions.

These problems associated with chlorinated rubber coatings have existed since chlorinated rubber was first utilized in the coatings industry approximately fifty years ago. They have become more serious since the Environmental Protection Agency began in 1967 to regulate VOC levels in coatings and they will become even more serious as more and more stringent environmental regulations take effect in the future.

A need therefore exists for a functionalized chlorinated rubber that will act as a convertible binder, i.e. a reactive binder, in coating applications, thereby reducing VOC levels, and that will impart improved solvent resistance to coating formulations.

Functionalization, or chemical modification, of chlorinated rubber has been a topic of extensive studies in recent years. Most of the studies have used direct modifications of chlorinated rubber, such as free radical initialized graft copolymerization with a variety of functional acrylate or styrene monomers. Direct modifications of chlorinated rubber are limited, however, due to its chemical inertness and thermal instability. Moreover, unwanted side reactions such as polycondensation and elimination are unavoidable.

Hydroxylation of rubber via saponification of the reaction adduct of rubber and haloacetic acids has been recently reported. Y. H. Kim and A. Pandya, *Macromolecules*, 24, 6505–11 (1991). However, the commercial value of the product, partially hydroxylated rubber, also known as hydroxyrubber, was not assessed, nor were coating applications mentioned, since hydroxyrubber does not possess properties necessary for coating grade materials.

SUMMARY OF THE INVENTION

In accordance with one aspect of the present invention, there is provided a composition comprising chlorinated hydroxyrubber.

In accordance with another aspect of the present invention, there is provided a method for making chlorinated hydroxyrubber. The method comprises chlorinating partially hydroxylated rubber obtained by the saponification of the reaction adduct of rubber and trichloroacetic acid without isolation of the adduct. The rubber which can be utilized includes masticated natural rubber, masticated synthetic rubber, low molecular weight natural rubber, and low molecular weight guayule rubber ("LMWGR"). The hydroxyl and chlorine content of the chlorinated hydroxyrubber product can be altered by varying the reaction time and stoichiometry. No unwanted side reactions have been noted.

In accordance with yet another aspect of the present invention, there are provided a method for making and formulations for environmentally compliant low volatile organic content (VOC) coating compositions comprising chlorinated hydroxyrubber.

Chlorinated hydroxyrubber provides improved properties in coating applications when compared to chlorinated rubber. Chlorinated hydroxyrubber is a convertible binder, and, thus, allows crosslinkable reactive diluents to be utilized in coatings formulations, so that the solids content of the coatings will be increased. Because it is cured by both chemical reaction with reactive diluents and solvent evaporation, it reduces the VOC levels in coatings formulations, thereby reducing air pollution. Chlorinated hydroxyrubber also imparts excellent solvent resistance to coatings formulations because of the crosslinking of reactive diluents and the functional groups of the chlorinated rubber.

Chlorinated hydroxyrubber can be used either as a precursor for further modification or as a convertible binder in coating compositions. Formulation examples and coating properties of high solids polyurethane coatings comprising chlorinated hydroxyrubber are provided.

Other features and advantages of the present invention will become apparent from the following detailed description, which is given by way of illustration only.

DETAILED DESCRIPTION OF THE INVENTION

There is provided a composition comprising chlorinated hydroxyrubber.

There is also provided a method for making chlorinated hydroxyrubber via chlorination of partially hydroxylated rubber with chlorine gas.

The partially hydroxylated rubber is prepared by saponification of the reaction adduct of rubber and trichloroacetic acid. The saponification is performed without isolation of the reaction adduct. The hydroxyl content of the hydroxylated rubber is controlled by varying the reaction time and stoichiometry between rubber and trichloroacetic acid.

The rubber which can be utilized includes masticated natural rubber, masticated synthetic rubber, low molecular weight natural rubber, i.e., rubber having a molecular weight less than about 200,000, and low molecular weight guayule rubber.

Chlorinated hydroxyrubber is then prepared by chlorinating the partially hydroxylated rubber with chlorine gas. The method comprises the steps of dissolving partially hydroxylated rubber in chloroform; purging the reaction system with nitrogen gas; introducing chlorine gas into the reaction system; allowing the solution to reflux with constant agitation; and precipitating the chlorinated hydroxyrubber with methanol.

The method according to the present invention will be further described by the following non-limiting example.

EXAMPLE 1

Rubber Sources

Liquid natural rubber, DPR-40 and DPR-400, was provided by Hardman Inc. and purified by dissolution in methylene chloride followed by precipitation from methanol. The numbers following the product designation indicate the viscosity of the rubber. For example, DPR-40 has a viscosity of 40,000 centipoise at 100° F. Low molecular weight guayule rubber was isolated from guayule resin supplied by Bridgestone/Firestone Inc.

Synthesis of Hydroxyrubbers

Hydroxyrubber derived from the different rubber sources, DPR-40, DPR-400 and low molecular weight guayule rubber, was synthesized as follows.

To 350 mL of 5% (w/w) rubber in anhydrous toluene in a 500 mL Erlenmeyer flask was added 56.8 g of trichloroacetic acid. The solution was stirred for 48 hours at 0° C. under a $N_2$ atmosphere. The solution was poured into a 1000 mL Erlenmeyer flask containing 60.7 g of sodium methoxide and 100 mL of methanol. After the mixture was continuously stirred for 20 hours, 34.7 mL of acetic acid was added to neutralize the mixture. The mixture was stirred for an additional 15 minutes after which it was poured into 650 mL of methanol and the pH adjusted to 5-6 with a few drops of acetic acid. The product was precipitated, washed with methanol and 50% (v/v) methanol in water, and dried in a vacuum oven. Additional purification of the hydroxyrubber was accomplished by dissolving in 100 mL methylene chloride and precipitating via the addition of 400 mL of methanol.

Synthesis of chlorinated hydroxyrubbers

Chlorinated hydroxyrubber derived from the different rubber sources was synthesized as follows.

A solution of 5% (w/w) hydroxyrubber (derived from DPR-40, DPR-400, or low molecular weight guayule rubber) in $CHCl_3$ (280 mL) was added to a three neck flask fitted with a water condenser, gas inlet tube and a glass stopper. The inlet tube was connected via Teflon tubes, through a gas trap, to a chlorine cylinder. The exit port of the condenser was connected to two traps filled with concentrated sodium hydroxide. The reaction flask was immersed in an oil bath for temperature control. Nitrogen was purged through the system for more than 15 minutes before introducing chlorine gas. The solution was allowed to reflux with constant agitation via a magnetic stirrer. A slight excess of chlorine was delivered into the reaction vessel while the liberated hydrogen chloride was trapped in the sodium hydroxide solutions. The product was precipitated with 600 mL methanol after the reaction was completed. The chlorination was confirmed by the C—Cl absorption at 758 $cm^{-1}$ in Fourier transfer infrared spectra (FTIR) and by elemental analysis. The presence of hydroxyl groups are evidenced by the O—H absorption peak in the range of 3400–3600 $cm^{-1}$ in FTIR.

Properties (hydroxyl content, chlorine content, and glass transition temperature ($T_g$)) of chlorinated hydroxyrubbers derived from the different rubber sources are tabulated in Table 1. The hydroxyl content was calculated by assuming that the chlorination would not affect hydroxyl groups in hydroxyrubber. The chlorine content was determined by elemental analysis. Chlorinated hydroxyrubbers derived from different rubber sources have similar hydroxyl and chlorine content, but differing glass transition temperatures. Generally, chlorinated hydroxyrubber with a higher hydroxyl content has a higher glass transition temperature, a likely consequence of its stronger interchain hydroxyl H-bonding interactions.

TABLE 1

| Properties of chlorinated hydroxyrubber ("CHR"). | | | |
|---|---|---|---|
| CHR | DPR-40 | DPR-400 | LMWGR |
| OH content (Wt) | 2.8% | 2.8% | 2.7% |
| Cl content (Wt) | 52.7% | 51.4% | 47.1% |
| Tg °C. | 104.9 | 91.9 | 85.4 |

Chlorinated hydroxyrubber can be used as a precursor for further modification or can be used as a convertible binder in a wide variety of coating compositions to meet various requirements of different uses, including can coatings, coil coatings, and leather finishes.

Coating formulations comprising chlorinated hydroxyrubber according to the present invention will be further described by the following non-limiting example.

EXAMPLE 2

Formulations of polyurethane coatings comprising chlorinated hydroxyrubber are listed in Table 2. The polyurethane chlorinated hydroxyrubber coatings typically comprise chlorinated hydroxyrubber from Example 1; catalyst; alcohol, preferably a liquid polyol such as Tone 301; and isocyanate, preferably a liquid polyisocyanate such as Desmodur N-100, and more preferably a hexamethylene diisocyanate based polyisocyanate. The polyisocyanate has an isocyanate content in the range of about 0 to 30% in excess of hydroxyl equivalent, and preferably in a range of about 5 to 10% in excess of hydroxyl equivalent.

Chlorinated hydroxyrubber coatings are insoluble in solvents known for their ability to dissolve chlorinated rubber (e.g., methylene chloride and xylene). The crosslinking of chlorinated hydroxyrubber and polyisocyanate improves the solvent resistance of chlorinated rubber coatings dramatically.

The catalyst is preferably an organotin catalyst or a tertiary amine catalyst, such as triethylenediamine, triethylamine, or 2,6-lutidine. The catalyst of the Example formulations is an organotin catalyst, Metacure T-120, The coating compositions of this Example were prepared by dissolving additives, catalyst, and chlorinated hydroxyrubber in an organic solvent, such as methylene chloride, toluene, xylene, carbon tetrachloride, chloroform, trichloroethane, chlorobenzene, and the like, with shaking. The additives of the Example formulations are an ester solvent, Ektapro EEP, and surface active agents, Byk 080 and Byk 325.

The chlorinated hydroxyrubber, catalyst, and additives were ground together with a high speed mixer and dissolved in solvent. Polyisocyanate was then added and the mixture was thoroughly stirred. The term "let down" is used to indicate that ingredients of the Example formulations which precede the let down line in Table 2 are ground together and dissolved in solvent prior to the addition of the polyisocyanate following the let down line.

TABLE 2

Formulation (in grams) of chlorinated hydroxyrubber ("CHR") polyurethane coatings.

| Formulation No. | 1 | 2 | 3 | Suppliers |
|---|---|---|---|---|
| CHR DPR-40 | 40.3 | | | USM |
| CHR DPR-400 | | 40.0 | | USM |
| CHR LMWGR | | | 39.8 | USM |
| Tone 301 | 9.7 | 9.7 | 9.7 | Union Carbide |
| Ektapro EEP | 20.0 | 20.0 | 20.0 | Eastman |
| Xylene | 25.0 | 25.0 | 25.0 | Aldrich |
| Metacure T-120 | 0.15 | 0.15 | 0.15 | Air Products |
| Byk 080 | 0.20 | 0.20 | 0.20 | Byk |
| Byk 325 | 0.20 | 0.20 | 0.20 | Byk |
| Let down | | | | |
| Desmodur N-100 | 35.0 | 35.1 | 34.9 | Mobay |

The coatings were applied with a draw bar at a wet thickness of 2 mils. Standard aluminum Q-panels were used for all tests with the exception of impact evaluations which used steel panels and free films which were obtained by using polyethylene panels. All tests were performed according to ASTM methods (with their ASTM number in Table 3) after the coatings cured for 7 days at ambient temperature.

Coating performance is tabulated in Table 3.

TABLE 3

Properties of chlorinated hydroxyrubber coatings.

| Properties: | Formulation 1 | Formulation 2 | Formulation 3 | ASTM Method# |
|---|---|---|---|---|
| Wet thickness | 2 mils | 2 mils | 2 mils | |
| Drying time: | | | | D-1640 |
| Set to touch | 15 min | 15 min | 15 min | |
| Dust free | 30 min | 30 min | 30 min | |
| Tack free | 105 min | 105 min | 105 min | |
| Solid content by weight | 65.5% | 65.5% | 65.4% | |
| Pencil hardness | 2H | 2H | 2H | D-3363 |
| Tensile strength (Kpsi) | 4.0 | 3.6 | 3.9 | D-2370 |
| Elongation at break | 11% | 13% | 12% | D-2370 |
| Impact (in-lb): | | | | |
| direct | 140 | 120 | 120 | Gardener Tester |
| reverse | 100 | 80 | 80 | |
| Adhesion | 5B | 5B | 5B | D-3359 |
| MEK (double rub) | 200 | 200 | 200 | D-4752 |
| 8 hour spot tests: | | | | D-1308 |
| Water | 5 | 5 | 5 | |
| Conc. NH$_4$OH | 5 | 5 | 5 | |
| 10% NaOH | 5 | 5 | 5 | |
| 20% H$_2$SO$_4$ | 5 | 5 | 5 | |

5 = no effect
4 = stains only
3 = blistering

TABLE 3-continued

Properties of chlorinated hydroxyrubber coatings.

| Properties: | Formulation 1 | Formulation 2 | Formulation 3 | ASTM Method# |
|---|---|---|---|---|

2 = lifted film
1 = failure

Chlorinated hydroxyrubber coatings are insoluble in solvents known for their ability to dissolve chlorinated rubber (e.g., methylene chloride and xylene). The crosslinking of chlorinated hydroxyrubber and hexamethylene diisocyanate based polyisocyanate improves the solvent resistance of chlorinated rubber coatings dramatically. The coatings are tough, high gloss, resistant to water, organic solvent, and most chemicals.

While the foregoing detailed description has been directed to particular embodiments of the invention for the purpose of illustration and explanation, it will be apparent to those skilled in the art that modifications and variations in the method and coating compositions set forth can be effected within the scope and spirit of the invention. For example, alterations in the composition of the coating formulations will affect coating properties. Thus compositional variations can be used to formulate a variety of coatings for different applications with concomitant changes in physical and chemical properties.

What is claimed is:

1. A composition comprising chlorinated hydroxyrubber wherein the chlorine and hydroxyl groups are attached to isoprene moieties.

2. The composition according to claim 1 wherein said hydroxyrubber is obtained by saponification of the reaction adduct of rubber and trichloroacetic acid without isolation of the adduct.

3. The composition according to claim 2 wherein said rubber is selected from the group consisting of masticated natural rubber, masticated synthetic rubber, low molecular weight natural rubber, and low molecular weight guayule rubber.

4. A method of making chlorinated hydroxyrubber comprising reacting hydroxyrubber with chlorine gas.

5. The method of claim 4 wherein said hydroxyrubber is obtained by saponification of the reaction adduct of rubber and trichloroacetic acid without isolation of the adduct.

6. The method of claim 5 wherein said rubber is selected from the group consisting of masticated natural rubber, masticated synthetic rubber, low molecular weight natural rubber, and low molecular weight guayule rubber.

7. The method of claim 6 wherein the rubber is purified by dissolution in methylene chloride followed by precipitation from methanol prior to reaction of said rubber with trichloroacetic acid.

8. A method of making chlorinated hydroxyrubber comprising the steps of:

(i) dissolving hydroxyrubber in chloroform;

(ii) purging the reaction system with nitrogen gas;

(iii) introducing chlorine gas into the reaction system;

(iv) allowing the solution to reflux with constant agitation; and (v) precipitating chlorinated hydroxyrubber with methanol.

9. A rubber coating composition comprising chlorinated hydroxyrubber Wherein the chlorine and hydroxyl groups are attached to isoprene moieties.

10. The rubber coating composition of claim 9 further comprising additives, catalyst, alcohol and isocyanate.

11. The rubber coating composition of claim 10 wherein said catalyst is an organotin catalyst or a tertiary amine catalyst.

12. The rubber coating composition of claim 10 wherein said alcohol is a liquid polyol and said isocyanate is a liquid polyisocyanate.

13. The rubber coating composition according to claim 12 wherein said polyisocyanate has an isocyanate content in the range of about 0 to 30% in excess of hydroxyl equivalent.

14. The rubber coating composition according to claim 13 wherein said polyisocyanate has an isocyanate content in the range of about 5 to 10% in excess of hydroxyl equivalent.

15. The rubber coating composition of claim 12 wherein the polyisocyanate is hexamethylene diisocyanate based polyisocyanate.

16. A method of making a chlorinated hydroxyrubber coating composition comprising the steps of:
   (i) dissolving chlorinated hydroxyrubber having chlorine and hydroxyl groups attached to isoprene moieties, catalyst, and additives in an organic solvent;
   (ii) adding isocyanate to the chlorinated hydroxyrubber solution of step (i); and
   (iii) stirring the mixture of isocyanate and chlorinated hydroxyrubber solution.

17. The method according to claim 16 wherein said organic solvent is selected from the group consisting of methylene chloride, toluene, xylene, carbon tetrachloride, chloroform, trichloroethane, and chlorobenzene.

18. The method according to claim 16 wherein said isocyanate is a liquid isocyanate.

19. The method according to claim 16 wherein said isocyanate is a polyisocyanate.

20. The method according to claim 19 wherein said polyisocyanate is hexamethylene diisocyanate based polyisocyanate.

21. The method according to claim 19 wherein said polyisocyanate has an isocyanate content in the range of about 0 to 30% in excess of hydroxyl equivalent.

22. The method according to claim 21 wherein said polyisocyanate has an isocyanate content in the range of about 5 to 10% in excess of hydroxyl equivalent.

23. The method according to claim 16 wherein said catalyst is an organotin catalyst or a tertiary amine catalyst.

\* \* \* \* \*